US012648667B2

(12) United States Patent
Steiner

(10) Patent No.: US 12,648,667 B2
(45) Date of Patent: Jun. 9, 2026

(54) METHOD FOR PRODUCING COFFEE USING OPPOSED PISTONS

(71) Applicant: STEINER AG WEGGIS, Weggis (CH)

(72) Inventor: Adrian Steiner, Weggis (CH)

(73) Assignee: STEINER AG WEGGIS, Weggis (CH)

( * ) Notice: Subject to any disclaimer, the term of this patent is extended or adjusted under 35 U.S.C. 154(b) by 1070 days.

(21) Appl. No.: 17/754,111

(22) PCT Filed: Sep. 10, 2020

(86) PCT No.: PCT/EP2020/075371
§ 371 (c)(1),
(2) Date: Mar. 24, 2022

(87) PCT Pub. No.: WO2021/073810
PCT Pub. Date: Apr. 22, 2021

(65) Prior Publication Data
US 2022/0287496 A1 Sep. 15, 2022

(30) Foreign Application Priority Data

Oct. 14, 2019 (CH) ..................................... 01310/19

(51) Int. Cl.
*A47J 31/00* (2006.01)
*A47J 31/06* (2006.01)
(Continued)

(52) U.S. Cl.
CPC .............. *A47J 31/42* (2013.01); *A47J 31/06* (2013.01); *A47J 31/404* (2013.01); *A47J 31/4403* (2013.01)

(58) Field of Classification Search
CPC .......... A47J 31/06; A47J 31/14; A47J 31/404; A47J 31/42; A47J 31/4403
See application file for complete search history.

(56) References Cited

U.S. PATENT DOCUMENTS 3,652,292 A * 3/1972 Bach ........................ A23F 5/405
426/594
3,655,399 A * 4/1972 Pitchon ................... A23F 5/262
426/385
(Continued)

FOREIGN PATENT DOCUMENTS

CN 109907657 A 6/2019
DE 3130346 A1 2/1983
(Continued)

OTHER PUBLICATIONS

McPhee, Hanna. "The Golden Ratio For Brewing Coffee." Feb. 1, 2019. <https://fellowproducts.com/blogs/learn/the-golden-ratio-for-brewing-coffee?srsltid=AfmBOoplvcw6WB9za85nio3KfM9V0Q9YTEYuAyte16h_uPinp3AI5BIC>. Accessed Nov. 26, 2025. (Year: 2019).*
(Continued)

*Primary Examiner* — Ericson M Lachica
(74) *Attorney, Agent, or Firm* — Brian Roffe

(57) ABSTRACT

In a method for producing coffee, coffee beans are ground very finely, with or without the addition of water, and a mixture of the coffee powder and water is formed, and the coffee is extracted from this mixture and preferably conveyed to an outlet. Coffee beans and the water in the grinding chamber can be supplied to at least one mill, and the coffee beans ground with the water supplied, and the mixture formed from this. To form the mixture, cold or hot water is supplied to the mill during the grinding process in the grinding chamber and/or after the grinding process. Thus, the coffee produced has an especially full-bodied flavor.

19 Claims, 2 Drawing Sheets

(51) Int. Cl.

| | |
|---|---|
| *A47J 31/10* | (2006.01) |
| *A47J 31/40* | (2006.01) |
| *A47J 31/42* | (2006.01) |
| *A47J 31/44* | (2006.01) |

(56) References Cited

U.S. PATENT DOCUMENTS

| | | | | |
|---|---|---|---|---|
| 3,662,675 | A * | 5/1972 | Olland | A47J 31/408 |
| | | | | 99/289 R |
| 3,767,419 | A * | 10/1973 | Sienkiewicz | A23P 10/22 |
| | | | | 426/595 |
| 4,111,108 | A * | 9/1978 | Moser | A47J 31/3619 |
| | | | | 99/289 R |
| 4,187,992 | A * | 2/1980 | Del Valle | A47J 42/06 |
| | | | | 241/101.8 |
| 4,457,216 | A * | 7/1984 | Dremmel | A47J 31/3614 |
| | | | | 426/433 |
| 4,594,257 | A * | 6/1986 | Leblanc | A23F 5/405 |
| | | | | 426/453 |
| 4,633,771 | A * | 1/1987 | Anderl | A47J 31/002 |
| | | | | 99/289 R |
| 4,703,686 | A * | 11/1987 | Siegfried | A47J 31/40 |
| | | | | 99/279 |
| 4,962,693 | A | 10/1990 | Miwa et al. | |
| 5,230,277 | A * | 7/1993 | Bianco | A47J 31/3609 |
| | | | | 99/302 R |
| 5,277,102 | A * | 1/1994 | Martinez | G07F 13/02 |
| | | | | 99/287 |
| 6,192,785 | B1 | 2/2001 | Trida et al. | |
| 7,017,474 | B2 | 3/2006 | Comte | |
| 8,925,441 | B2 | 1/2015 | Steiner | |
| 9,622,618 | B2 | 4/2017 | Steiner | |
| 10,898,025 | B2 | 1/2021 | Steiner | |
| 2005/0109223 | A1 * | 5/2005 | Comte | A47J 31/3614 |
| | | | | 99/495 |
| 2006/0065128 | A1 * | 3/2006 | Lu | A47J 31/3619 |
| | | | | 99/279 |
| 2006/0260471 | A1 * | 11/2006 | Adler | A47J 31/32 |
| | | | | 99/279 |
| 2007/0034083 | A1 * | 2/2007 | Van Hattem | A47J 31/401 |
| | | | | 99/279 |
| 2008/0038441 | A1 * | 2/2008 | Kirschner | A47J 31/002 |
| | | | | 426/594 |
| 2009/0250491 | A1 * | 10/2009 | Erman | A47J 31/402 |
| | | | | 222/325 |
| 2011/0185912 | A1 * | 8/2011 | Chen | A47J 31/38 |
| | | | | 99/302 P |
| 2011/0283889 | A1 | 11/2011 | Con et al. | |
| 2012/0196009 | A1 * | 8/2012 | Casado Gomez | A47J 31/525 |
| | | | | 99/280 |
| 2012/0260806 | A1 * | 10/2012 | Rolfes | A47J 31/38 |
| | | | | 99/295 |
| 2013/0095219 | A1 * | 4/2013 | de Graaff | A47J 31/404 |
| | | | | 99/286 |
| 2016/0145038 | A1 | 5/2016 | Apone et al. | |
| 2016/0157665 | A1 * | 6/2016 | Doglioni Majer | A47J 31/3614 |
| | | | | 426/433 |
| 2016/0295876 | A1 * | 10/2016 | Smith | A23F 5/405 |
| 2016/0295906 | A1 * | 10/2016 | Jacobsen | A23L 5/34 |
| 2016/0374504 | A1 * | 12/2016 | Hoon | A47J 31/4403 |
| | | | | 426/231 |
| 2017/0000152 | A1 * | 1/2017 | Boehm | A23F 5/38 |
| 2017/0000289 | A1 * | 1/2017 | Feber | A23F 5/26 |
| 2017/0202236 | A1 * | 7/2017 | Pedersen | A23F 5/246 |
| 2017/0367518 | A1 * | 12/2017 | Anthony | A47J 31/0657 |
| 2018/0000108 | A1 * | 1/2018 | Boggavarapu | A47J 31/5251 |
| 2018/0110369 | A1 * | 4/2018 | Piras | A23F 5/08 |
| 2018/0153332 | A1 * | 6/2018 | Abbiati | A47J 42/40 |
| 2018/0206514 | A1 * | 7/2018 | Birch | A23F 5/483 |
| 2018/0310767 | A1 * | 11/2018 | Abbiati | A47J 42/50 |
| 2019/0045971 | A1 * | 2/2019 | Hartmann | A47J 31/52 |
| 2019/0069572 | A1 * | 3/2019 | Reh | A23F 5/28 |
| 2019/0223463 | A1 * | 7/2019 | Iwasa | A23F 5/02 |
| 2019/0223652 | A1 * | 7/2019 | Ford | A47J 31/408 |
| 2019/0231118 | A1 * | 8/2019 | Nishikawa | A47J 31/002 |
| 2019/0320840 | A1 * | 10/2019 | Vastardis | A47J 31/00 |
| 2019/0343321 | A1 * | 11/2019 | Gussmann | A47J 31/36 |
| 2019/0387920 | A1 * | 12/2019 | Anthony | A47J 31/0615 |
| 2020/0100521 | A1 * | 4/2020 | Fishter | A23F 5/38 |
| 2020/0359829 | A1 | 11/2020 | Light | |
| 2020/0390270 | A1 * | 12/2020 | Chioda | A47J 31/3628 |
| 2021/0219565 | A1 * | 7/2021 | Arnot | G01N 30/72 |
| 2021/0235918 | A1 * | 8/2021 | Chen | A23F 5/26 |
| 2022/0133091 | A1 * | 5/2022 | De Groen | A47J 42/18 |
| | | | | 241/259 |

FOREIGN PATENT DOCUMENTS

| | | | |
|---|---|---|---|
| EP | 4044879 | B1 | 3/2024 |
| FR | 2425220 | A1 | 12/1979 |
| IE | 20110230 | A1 | 11/2012 |
| WO | 2008006760 | A2 | 1/2018 |
| WO | 2019046812 | A1 | 3/2019 |
| WO | 2021073810 | A1 | 4/2021 |

OTHER PUBLICATIONS

Guerra, Gisselle. Perfect Daily Grind. "How Grind Size Can Help You Brew Better Tasting Coffee." Jun. 15, 2018. <https://perfectdailygrind.com/2018/06/how-grind-size-can-help-you-brew-better-tasting-coffee/>. Accessed Nov. 26, 2025. (Year: 2018).*

Cooper, Jahasia. Whole Latte Love. "The Benefits of Using the RDT Technique on Baratza Sette Grinders." Jul. 23, 2019. <https://www.wholelattelove.com/blogs/articles/the-benefits-of-using-the-rdt-technique-on-baratza-sette-grinders?srsltid= AfmBOoqlWWaB58cjBAzE6YlhLSklznS69wiCxMLnD74O0WPXSJx_etNX>. (Year: 2019).*

* cited by examiner

METHOD FOR PRODUCING COFFEE USING OPPOSED PISTONS

FIELD OF THE INVENTION

The invention relates to a method for producing coffee in which coffee beans are ground and the coffee is produced from the coffee powder and water and conveyed to an outlet, and a related device including at least one container containing coffee beans, at least one mill with a grinding chamber for grinding the coffee beans, a unit for extracting the coffee, and an outlet.

BACKGROUND OF THE INVENTION

With a known method according to the printed publication U.S. Pat. No. 6,192,785, cold coffee, with or without milk, can be dispensed from a coffee machine, in that the cold coffee is pre-prepared and filled into a container, then sucked up in a controlled manner by a pump and, via a connection element and corresponding closure valves, either heated by a flow heater or conveyed through a line, in the cold state, directly to the outlet nozzle. This coffee filled into the container is preferably produced in a conventional manner by brewing by means of hot water and then filled into the container and cooled. It is therefore possible optionally for cold or hot coffee to be dispensed, but not produced as fresh coffee.

OBJECTS AND SUMMARY OF THE INVENTION

The invention is based on the object of providing a method and device respectively by means of which, in particular, cold coffee can be produced in a relatively short time, and the prepared coffee in this case then has a specially full-bodied taste, and with this the flavor substances contained in the coffee beans are better extracted.

This object is solved according to the invention in accordance with the features of a method and device as follows.

With this method according to the invention, with which the coffee beans are ground very finely with or without the addition of water, and a mixture of the coffee powder and water are formed, and from this mixture the coffee is extracted and preferably conveyed to the outlet, the coffee thereby produced has a pleasant new form of full-bodied flavor.

With one embodiment variant according to the invention, coffee beans and water are conveyed into the grinding chamber of at least one mill, and the coffee beans are ground together with the water which is filled in. As a result, a mixing of coffee and water already takes place at the grinding stage, which improves the extraction of the coffee filtered out of this.

Very advantageously, cold water at room temperature is used for the mixing and extraction of the coffee. It can advantageously be additionally cooled before the mixing and/or thereafter, since the water is heated during the grinding. It is also possible, however, for hot water to be used.

The mixing proportion of coffee beans to the water, the duration of the grinding, and/or the degree of grinding of the coffee powder are predetermined, such that the coffee extracted from this exhibits the desired taste.

According to the invention, the method is used in a coffee machine with which hot coffee can be produced by brewing and dispensed. With this additional option, coffee with the desired flavor can be produced and dispensed by the push of a button in the same time as brewed coffee produced in the conventional manner.

BRIEF DESCRIPTION OF THE DRAWINGS

The invention and its further advantages are explained in greater detail hereinafter on the basis of exemplary embodiments by making reference to the drawings, wherein.

DETAILED DESCRIPTION OF THE INVENTION

Figure 1:
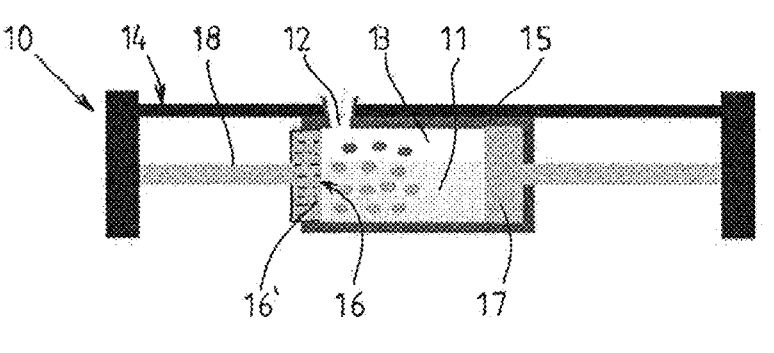
FIG. 1 is a schematic section through a unit of a device according to the invention, during the filling of a mixture in a chamber in a cylinder.

A method is provided for producing coffee, with which coffee beans are ground, and from the coffee powder and water the coffee is produced and conveyed to an outlet. Used as the coffee beans are, advantageously, roasted or at least lightly roasted beans, which, depending on the specific taste, can derive from different areas where such beans are cultivated.

According to the invention, the coffee beans are ground very finely, with or without the addition of water, and a mixture of the coffee powder and water is formed, and from this mixture the extracted coffee is, in particular, filtered and preferably conveyed to the outlet.

With one exemplary embodiment, coffee beans and water are conveyed into a grinding chamber of a mill, and the coffee beans are ground together with the water which is filled in, and the mixture is formed, and from this the extracted coffee is preferably conveyed to an outlet.

It is possible for cold water at approximately room temperature to be conveyed for the grinding into the grinding chamber of the mill. This cold water is advantageously additionally cooled before the mixing into the grinding chamber and/or thereafter, since the water is heated during the grinding, such that, at the outlet as extracted coffee, it exhibits approximately room temperature, or a selectable temperature. This can be achieved by corresponding cooling means and, as appropriate, by a temperature controlling arrangement. Drinking water can be used as the water, which has a high degree of purity and does not contain chlorine. It would also be possible, however, for a water mixture to be used with flavor additives or other additives.

The coffee beans and the water which can be filled into the grinding chamber are preferably precisely metered, such that a predetermined mixing ratio is produced, which is selected in such a way that an optimum taste is produced with the coffee which is extracted from it. Likewise, the duration of the grinding is determined, and with this the degree of grinding of the coffee powder. The finer the grain sizes of the ground coffee, the better is the penetration of the water in the mixture, and therefore the flavor can largely be absorbed from it. These grain sizes of the coffee powder preferably amount on average to less than 200 μm, and advantageously even less than 150 μm.

Purposefully, metering means are provided in each case both at the outlet of the coffee bean container as well as in the water feed line, each of which can be actuated by a control device, which is not represented in any greater detail. These metering means make it possible for the quantity introduced from both sources can, on the one hand, be precisely metered, and, on the other, can also be varied.

Depending on requirements, the water can be introduced into the grinding chamber of the mill simultaneously or after a specific grinding time of the coffee beans. This depends on factors which are to be taken into account, such as, for example, the degree of hardness of the coffee beans.

Before the coffee is extracted from the mixture, it can be advantageous for the mushy mixture which is formed from the coffee powder and the water to be left for a period of time, for example in a separate container, in order thereby to improve the transfer of flavor from the powder into the water. In addition, in this situation cooling of the coffee which has been formed can take place, as required, by means of a temperature control arrangement.

The device for carrying out the method according to the invention explained heretofore consists of at least one container containing coffee beans, at least one mill with a grinding chamber for grinding the coffee beans, and a unit 10 for producing the coffee, and an outlet into a drink's container. Assigned to this device is a program control unit with a display with a touchscreen or the like, by means of which the method in question is carried out. The device can, of course, also contain further elements.

FIGS. 1-4 show in principle, a unit 10 for the extraction of the coffee from the mixture 11, which is formed from coffee powder and water. The unit 10 comprises, in a housing frame 14 indicated, a cylinder 15 which can be moved to and fro, with at least one filling opening 12, and two pistons 16, 17, which form in this cylinder 15 a sealed chamber 13 and can be moved relative to one another. The one piston 16, also referred to herein as a first piston, is provided with a sieve screen 16' and is connected to an outlet line 18. In this situation, it is secured in a fixed manner to the housing frame 14, and cannot be moved. The opposing piston 17, also referred to herein as a second piston, is mounted so as to be movable in the cylinder 15 by a drive, not shown, as is explained further hereinafter.

The delivery of the coffee beans and the water into the mill, which is likewise not shown, with the grinding chamber with at least one opening, is carried out by a conveying means, for example a conveying worm and a water pump. The mill comprises on the outlet side a connection line, which leads into the filling opening 12 of the cylinder 15. The coffee bean container could, however, also be arranged in a known manner above the mill, and therefore the coffee beans are always located above the mill, and are delivered without conveying means.

FIG. 1 shows the pistons 16, 17, which are each positioned at the end side in the cylinder 15, producing a sealing effect, with which the filling opening 12 is in an open position, and the mixture 11 of water and coffee powder is filled out of the mill in portions into this chamber 13.

Figure 2:
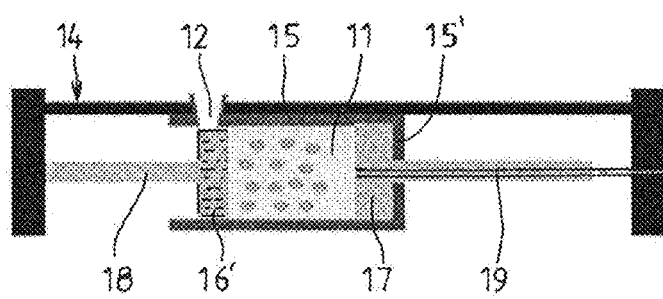
FIG. 2 is a schematic section of the unit during the pressing of a piston in the cylinder.

As soon as the chamber 13 is preferably close to being filled with the mixture 11, as can be seen in FIG. 2, in the cylinder 15, on its rear side 15', the one piston 17 is pressed against the other fixed piston 16, and in this situation the filling opening 12 in the cylinder is closed by the latter piston, and, by the pressure of the piston 17 onto the mixture 11, the coffee liquid is pressed through the filtering screen sieve 16', and, in the extracted state, is conveyed through the outlet line 18 to an outlet, and filled into a cup or similar.

The pressing of the one piston 17 against the other piston 16 inside the cylinder 15 can take place by the producing of a negative pressure in the chamber 13, in addition to the mechanical compression movement of the two pistons, which is not represented in any greater detail. It would be necessary for at least one switchable line connection to be provided between a device for producing a negative pressure (vacuum) and the chamber 13 by way of one or both pistons 16, 17, and/or by means of the cylinder 15.

It is also possible for a passage opening 19 for water to be provided in the piston 17, in order to introduce water as required, for flushing or if, for example, the mixture is too viscous, or if the flow through the screen sieve 16' were to become clogged, as is shown in FIG. 2.

Figure 3:
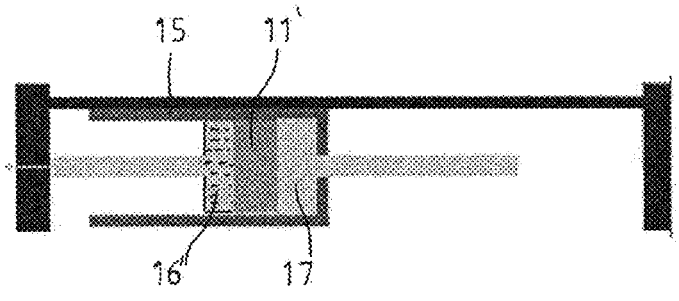
FIG. 3 is a schematic section of the unit in the compressed state of the mixture.

FIG. 3 shows the end position of the cylinder 15, and with it the piston 17 moved with it, with which close to all the coffee is extracted, and only the coffee pack 11' as compressed cake still remains in the chamber 13.

Figure 4:
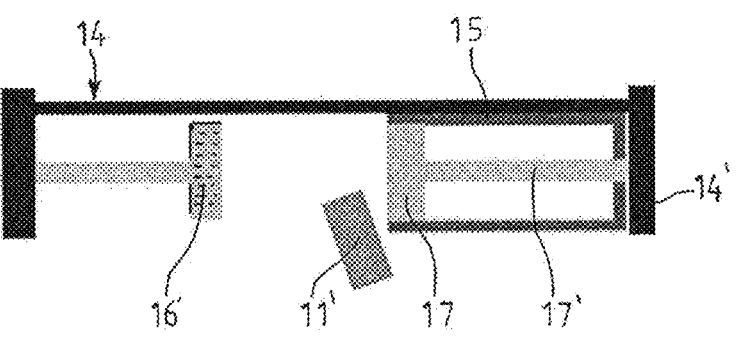
FIG. 4 is a schematic section of the unit, in which the cylinder and one piston are drawn away from the other piston.

According to FIG. 4, after the extraction is completed, the cylinder 15 and the piston 17 remaining in it, is retracted with its piston rod 17', as far as against a stop wall 14' of the housing frame 14. The lengths of the cylinder 15 and of the piston 17 are dimensioned in such a way that, when they come in contact, the coffee pack 11' is pushed by the piston 17 out of the cylinder 15, and falls downwards into a catchment container.

As advantageous variants, it would be possible not only to provide the piston 16 with a screen sieve 16' and be connected to an outlet line 18, but the opposing piston 17 could also be assigned a screen sieve and an outlet line. Likewise, the passage opening 19 for the feeding of water could be provided in one or both pistons, in order to provide water if required, which would be arranged parallel to the respective outlet line. There would then be corresponding valves provided in these lines, in order to carry out the functions referred to.

Figure 5:
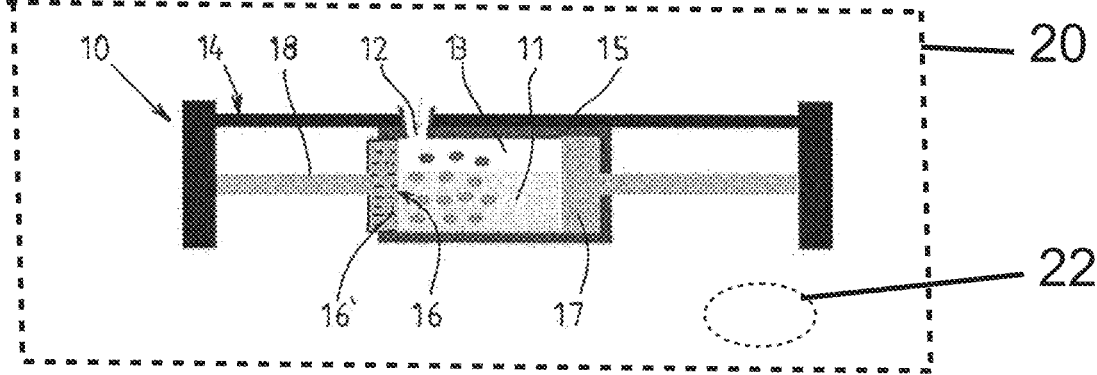
FIG. 5 is a schematic of a coffee machine including the device according to the invention as shown in FIG. 1

Very advantageously, in order to produce cold coffee in particular, this device is integrated into a coffee machine 20, with which, as the main object, as well as milk or foamed milk, hot coffee can be produced and dispensed (the coffee machine 20 being illustrated schematically in FIG. 5). This device could in principle be integrated in such a way that use would be made of the containers with coffee beans and the water connection, which are already present. The unit 10 for extracting the cold coffee and the outlet 22 on the front side of the coffee machine 20, which is coupled to the outlet line 18 of the unit 10, would be installed separately.

The invention has been adequately explained with the exemplary embodiments described heretofore. It can, however, also be explained by further variants. The extracted coffee could also be conserved not directly at the connection, but in a container, over a specific period of time, and only after this be conveyed to the outlet. This would incur the advantage that the flavor of the extracted coffee would be still more marked and intensive.

Instead of being filled into the unit 10, the mushy consistency mixture of the coffee powder and water could also be filled into at least one coffee filter, and the coffee filtered out of this by running out. In this situation, cold or also hot water could be used. A water mixture would also be possible for the mixing stage, for example with means for promoting the extraction or the full-bodied taste.

For spatial reasons, the unit 10 with the horizontally moving cylinder 15 and piston 17 could also be arranged vertically or at with an angle between them.

Coffee machines could also be used which are provided in a known manner with removable pistons, into which either coffee powder is filled or pads are laid, which could likewise be additionally provided with a device according to the invention.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

The invention claimed is:

1. A method for producing coffee at an outlet of a coffee machine, the method comprising:

positioning a movable cylinder having a filling opening in a position in which the filling opening is in communication with a chamber defined in the movable cylinder between first and second pistons, the first piston being provided with a screen sieve and being connected to an outlet line, the first and second pistons having multiple relative positions in which the first and second pistons are spaced different distances from one another, forming a mixture of coffee powder and water in the chamber, the step of forming the mixture of coffee powder and water in the chamber comprising introducing, when the movable cylinder is in the position in which the filling opening is in communication with the chamber, the coffee powder through the filling opening into the chamber, closing, using a portion of the first piston, the filling opening of the movable cylinder after the coffee powder has been introduced into the chamber through the filling opening, then extracting the coffee from the mixture of coffee powder and water in the chamber by, while the movable cylinder is moving, reducing the distance between the first and second pistons to cause the coffee to be extracted from the mixture of coffee powder and water in the chamber and conveyed through the screen sieve of the first piston into the outlet line connected to the first piston, and then conveying the extracted coffee through the outlet line to the outlet of the coffee machine.

2. The method according to claim 1, wherein the step of forming the mixture of coffee powder and water further comprises:

delivering unground coffee beans and an amount of water into a grinding chamber in the coffee machine, the grinding chamber being different than the chamber defined in the movable cylinder between the first and second pistons; and then grinding the coffee beans with the amount of water in the grinding chamber to thereby form the mixture of coffee powder and water, whereby the coffee powder is introduced into the chamber as part of the mixture of coffee powder and water which is introduced into the chamber through the filling opening.

3. The method according to claim 2, wherein the step of delivering the unground coffee beans and the amount of water into the grinding chamber comprises introducing water into the grinding chamber simultaneously with introduction of the coffee beans into the grinding chamber.

4. The method according to claim 2, further comprising cooling the amount of water before the amount of water is introduced into the grinding chamber and/or after the grinding of the coffee beans and the amount of water in the grinding chamber to form the mixture of coffee powder and water.

5. The method according to claim 1, wherein the step of forming the mixture of coffee powder and water further comprises:

delivering unground coffee beans into a grinding chamber in the coffee machine, the grinding chamber being different than the chamber defined in the movable cylinder between the first and second pistons; then grinding the unground coffee beans in the grinding chamber to form the coffee powder; and then introducing water into the coffee powder in the grinding chamber to form the mixture of coffee powder and water, whereby the coffee powder is introduced into the chamber as part of the mixture of coffee powder and water which is introduced into the chamber through the filling opening.

6. The method according to claim 1, further comprising maintaining the mixture of coffee powder and water in the chamber for a period of time, and then, after the period of time, filtering the extracted coffee out of the mixture of coffee powder and water.

7. The method according to claim 1, wherein the mixture of coffee powder and water is filled into at least one coffee filter, and the extracted coffee is filtered by running out of the at least one coffee filter.

8. The method according to claim 1, wherein the second piston is opposite the first piston and the second piston comprises a passage opening for water to enable conveying of water into the chamber or flushing of the chamber, the step of forming a mixture of coffee powder and water in the chamber further comprising introducing the water into the chamber through the passage opening for water in the second piston.

9. The method according to claim 1, further comprising moving the movable cylinder, and the second piston in the movable cylinder, away from the first piston until the first piston is outside of the movable cylinder after the extraction is completed, to enable a coffee pack formed upon extraction of the coffee from the coffee powder and the water to be pushed by the second piston out of the movable cylinder.

10. The method according to claim 1, wherein the average grain size of the coffee powder amounts to less than 200 µm.

11. The method according to claim 1, wherein the distance between the first and second pistons is reduced by moving the second piston toward the first piston by producing a negative pressure in the chamber in addition to mechanical compressing of the second piston toward the first piston.

12. The method according to claim 1, wherein the average grain size of the coffee powder amounts to less than 150 µm.

13. The method according to claim 1, wherein the step of forming the mixture of coffee powder and water further comprises:

delivering unground coffee beans into a grinding chamber in the coffee machine, the grinding chamber being different than the chamber defined in the movable cylinder between the first and second pistons; then grinding the unground coffee beans in the grinding chamber to form the coffee powder; and introducing water into the grinding chamber while the coffee beans are being ground in the grinding chamber to form the mixture of coffee powder and water, whereby the coffee powder is introduced into the chamber as part of the mixture of coffee powder and water which is introduced into the chamber through the filling opening.

14. The method according to claim 1, wherein the step of forming the mixture of coffee powder and water further comprises:

delivering unground coffee beans into a grinding chamber in the coffee machine, the grinding chamber being different than the chamber defined in the movable cylinder between the first and second pistons; then grinding the unground coffee beans in the grinding chamber to form the coffee powder; and then introducing water into the grinding chamber after the grinding of the coffee beans is over to form the coffee powder to thereby form the mixture of coffee powder and water, whereby the coffee powder is introduced into the chamber as part of the mixture of coffee powder and water which is introduced into the chamber through the filling opening.

15. The method according to claim 1, wherein the first piston is fixed to a housing frame of the coffee machine, the movable cylinder being movable relative to the housing frame and into a position in which the first piston is inside of the chamber in the movable cylinder.

16. The method according to claim 1, wherein the step of closing, using a portion of the first piston, the filling opening of the movable cylinder after the coffee powder has been introduced into the chamber through the filling opening comprises moving the movable cylinder toward the first piston until the first piston closes the filling opening of the movable cylinder.

17. The method according to claim 1, wherein the outlet line is in the first piston.

18. The method according to claim 1, wherein the step of forming the mixture of coffee powder and water further comprises introducing the water into the chamber through the filling opening when the movable cylinder is in the position in which the filling opening is in communication with the chamber.

19. The method of claim 1, further comprising:

positioning the movable cylinder in a housing frame of the coffee machine, the first piston being fixed to the housing frame, the second piston being movable in the movable cylinder relative to the first piston to thereby enable the first and second pistons to be spaced different distances from one another;

the step of closing, using a portion of the first piston, the filling opening of the movable cylinder after the coffee powder has been introduced into the chamber through the filling opening comprising moving the movable cylinder relative to the housing frame and around the first piston until the filling opening of the movable cylinder is closed by the first piston, the step of reducing the distance between the first and second pistons comprising moving the second piston toward the first piston.

\* \* \* \* \*